Feb. 12, 1935.　　E. C. OBERKIRCHER ET AL　　1,990,748
MOTOR DRIVEN VEHICLE
Filed Jan. 4, 1928　　4 Sheets-Sheet 1

Edward C. Oberkircher,
Charles G. Kaelin, Inventors,
By Emil Neuhart
Attorney.

Witness:
J. Oberst

Feb. 12, 1935.  E. C. OBERKIRCHER ET AL  1,990,748
MOTOR DRIVEN VEHICLE
Filed Jan. 4, 1928   4 Sheets-Sheet 2

Edward C. Oberkircher,
Charles G. Kaelin, Inventors.
By Emil Neuhart
Attorney.

Feb. 12, 1935. E. C. OBERKIRCHER ET AL 1,990,748
MOTOR DRIVEN VEHICLE
Filed Jan. 4, 1928 4 Sheets-Sheet 3
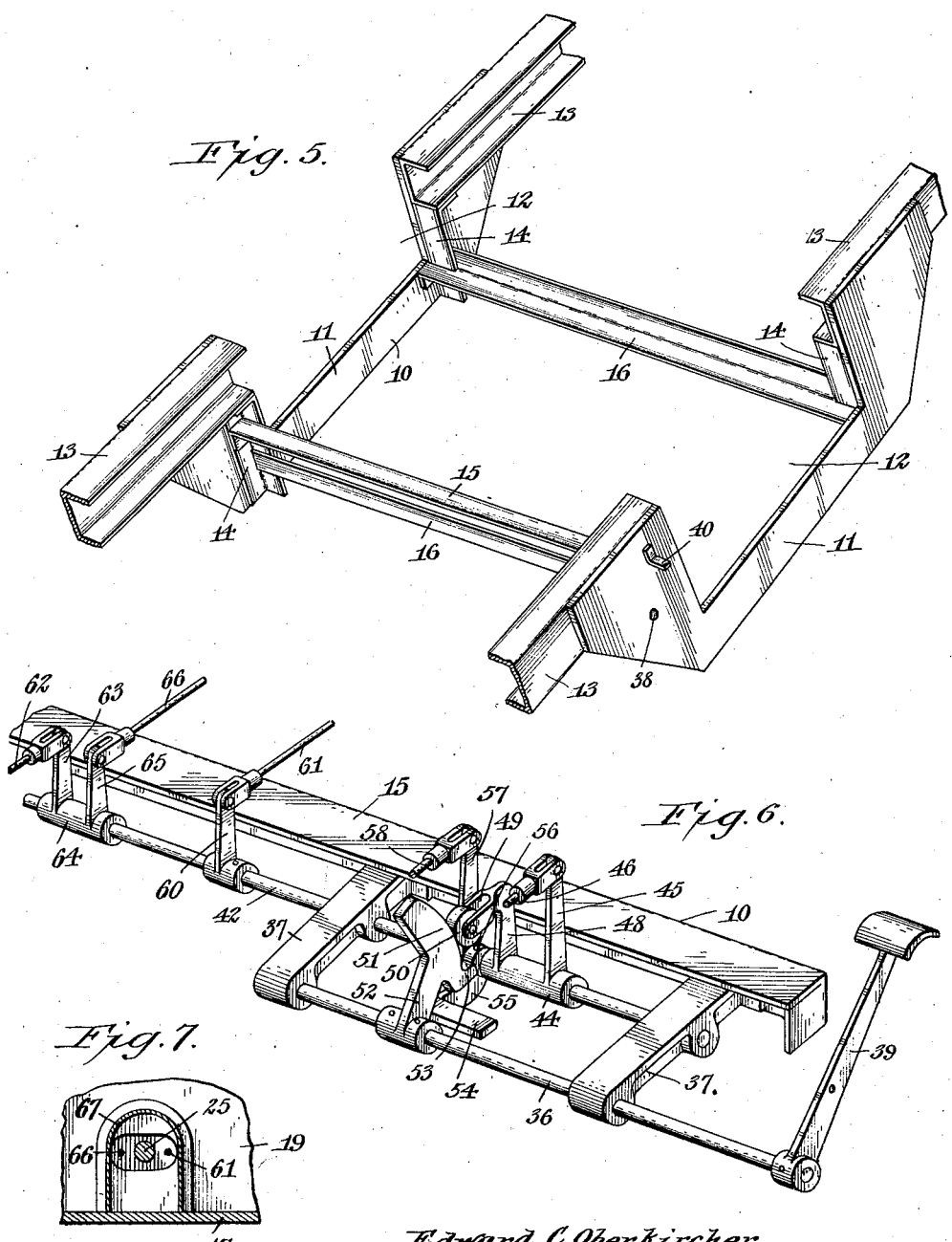

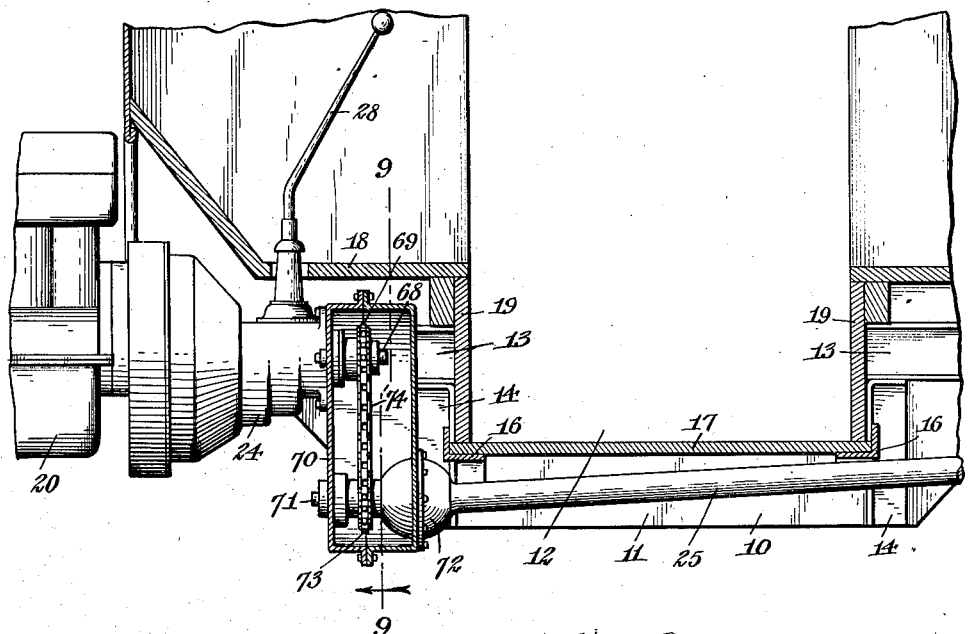
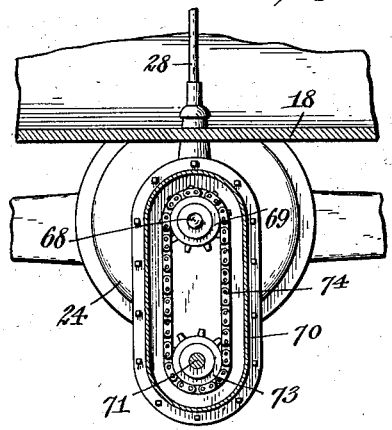

Patented Feb. 12, 1935

1,990,748

UNITED STATES PATENT OFFICE 1,990,748

MOTOR DRIVEN VEHICLE

Edward C. Oberkircher and Charles G. Kaelin, Buffalo, N. Y., assignors, by mesne assignments, to Continental-Divco Company, Detroit, Mich., a corporation of Michigan Application January 4, 1928, Serial No. 244,511

8 Claims. (Cl. 180—77)

Our invention relates to improvements in motor-driven vehicles, and more particularly to a motor-driven truck or delivery vehicle, especially adapted for use in delivering light parcels, packages, or the like, such as milk in bottles, bread and other baked goods, groceries, and many other articles.

Delivery of milk, bread, and many other food products is commonly made from house to house, or at short intervals, and this necessitates stopping the delivery vehicle, through the medium of which delivery is made, many times within a city block. Neighborhood grocers and other merchants are often required to make deliveries, or solicit orders, from house to house, or at houses within a short distance from each other; and such stops are commonly made by delivery vehicles of department stores and many other concerns.

Drivers or operators of delivery vehicles are greatly inconvenienced by reason of the fact that, when entering a vehicle, they must assume a stooping position and ascend two steps to reach the elevated floor of the vehicle; and in addition to this they are compelled, in motor-driven vehicles, to slide behind the steering wheel in order to be seated and assume a position in which they can properly operate the vehicle. After driving a short distance, oftentimes as little as thirty feet, they are compelled to again repeat such actions in reverse order and it is not uncommon when delivering milk or bread, for a driver to be compelled to leave and again enter the vehicle as often as four-hundred to five-hundred times each day, which is a strain on the driver and exceedingly tiresome.

In addition to the inconvenience of entering the vehicle and being seated in order to properly operate the same, considerable time is consumed during the day in the exercise of these laborious actions, and consequently, the number of deliveries it is possible to make over a given period of time is necessarily greatly minimized, not only due to the fact that time is consumed in entering and leaving the vehicle, but also due to the fact that the driver of the vehicle becomes "slowed-up" after having made numerous deliveries, although having accomplished only a portion of his day's work. These conditions exist whether delivering by means of a motor-driven vehicle or a horse-drawn vehicle, with the exception that the driver is enabled to more conveniently seat himself in a horse-drawn vehicle, due to the fact that it is not necessary to slide behind a steering wheel. The use of a horse-drawn vehicle, however, results in slow deliveries and it is possible to cover only a portion of the territory that can be covered when using a motor-driven vehicle. In some cities, owing to the congestion in traffic and the obstruction horses offer to progress of motor-driven vehicles, ordinances have been enacted restricting horses to certain zones within the city. In other cities, restrictions have been made permitting the use of horses during certain hours of the day only, or ordinances have been enacted restricting them to use after certain hours of the day, invariably in the evening or during the night. The disadvantages resulting from such restrictions, when using horse-drawn vehicles, is quite apparent, and it has become increasingly necessary to resort to the use of motor-driven vehicles in order to make deliveries.

The "turn-over" of help used in making deliveries is quite large, since the climbing necessary in entering the vehicles, whether horse-drawn or motor-driven, is a strain on the driver or operator, and he is invariably seeking some position or occupation less burdensome to him.

It is the primary object of our invention to provide a motor-driven vehicle wherein the above-mentioned disadvantages are obviated, and wherein provision is made for operating the vehicle while the driver or operator is in a standing position.

Another object of our invention is the production of a motor-driven vehicle capable of being operated while the driver or operator is in standing position, and in the more specific aspects of our invention, wherein the various operating parts of a standard automobile may be retained if desired so that the driver or operator may operate the vehicle while seated.

Another object of our invention is the production of a motor-driven vehicle having the standard steering mechanism, usually including a single steering post and steering wheel, and wherein the vehicle is guided in its course of travel by manipulation of said steering wheel when the driver or operator is standing or when seated, the driver or operator, in either instance, being directly behind said steering wheel.

Another object of our invention is to provide a motor-driven vehicle in which a platform is arranged in or on a standard automobile in a plane beneath that of the true floor, or level of the regulation floor, of the automobile, thus enabling the operator of the vehicle to operate the vehicle while standing on said platform.

Another object of our invention is the production of an automobile which may be entered from the level of the roadway by a single step of ordinary height or elevation, and wherein provision is made for operating the vehicle from such elevation.

A further object of our invention is to provide a floor for an automobile having at least two sections, one section being at the level of the regulation floor of a standard motor-driven vehicle, and the other being in a lower plane and having control mechanism operable from said plane.

A further object of our invention is to provide a motor-driven vehicle with a drop frame at a point along a short region of its length, and to provide a platform at the drop portion of said frame to enable the driver or operator to stand while driving the vehicle; and to further provide the vehicle with means to enable the driver to control the same while standing upon said platform.

A further object of our invention is to provide a motor-driven vehicle with a dropped or lowered portion between the motor of the vehicle and the rear or driving axle, whereby it is possible to conveniently enter the vehicle, and after driving the vehicle, to conveniently leave the same, all while in upright position.

A still further object of our invention is to provide a standard motor-driven vehicle equipped to be operated by a person while seated, with auxiliary control mechanism whereby certain operating effects necessary in driving motor-driven vehicles can be produced while in a standing position.

Our invention consists in the production of a motor-driven vehicle so equipped that it may be operated while the driver or operator is in standing position.

The invention also consists, in its more limited aspects, in the production of a motor-driven vehicle having the usual or standard control mechanism, all parts of which can be operated by the driver or operator when in a sitting position, and which can, in part, be directly operated by the driver or operator when in standing position; and wherein auxiliary control mechanism is provided which is in operative connection with certain parts of the standard control mechanism and operable while the driver is in standing position. Our invention, in its broader aspects, is not limited to the standard and auxiliary controls, as will be apparent from our statement of objects hereinbefore set forth and from certain of our claims hereinafter set forth.

The invention further consists in a motor-driven vehicle having a depressed platform on which the driver or operator of the vehicle may stand, and from which he may operate the vehicle while in standing position.

It still further consists in a standard motor-driven vehicle having a motor at its front end and a driving axle at the rear and connected with said motor; in having the chassis of the vehicle depressed or dropped between said motor and the driving shaft to provide a standing platform; and in providing mechanism whereby certain operating results, usually effected when the driver or operator is in sitting position, can be effected while the driver or operator is in standing position.

Our invention further consists in the novel features of construction and in the novel combination of parts to be hereinafter described and more particularly pointed out in the subjoined claims.

In the drawings:—

Fig. 5 is a perspective view of the drop portion of the frame or chassis.

Fig. 6 is a perspective view of the certain parts of the auxiliary control mechanism.

Fig. 7 is a transverse section taken on line 7—7, Fig. 4.

Fig. 8 is a longitudinal section through a portion of the vehicle showing our invention in modified form.

Fig. 9 is a transverse section taken on line 9—9, Fig. 8, looking in the direction of the arrow crossing said line.

Figure 1:
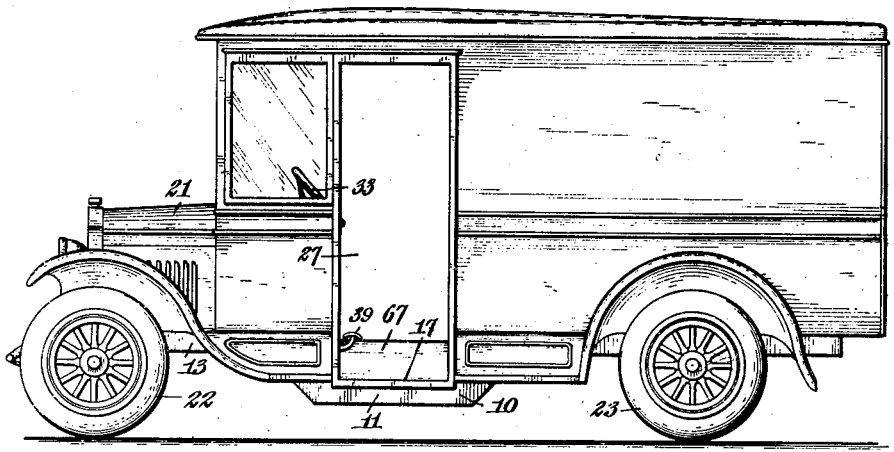
Fig. 1 is a side elevation of a motor-driven vehicle constructed in accordance with our invention.

While the principle of our invention may be embodied in any type of motor-driven vehicle, it is illustrated in the drawings, forming part of this specification, in connection with a standard gasoline-motor-propelled vehicle having the motor at its front end and in operative connection with the driving axle at the rear end of the vehicle. The chassis or frame of the vehicle may be constructed in any approved manner, the side members of the chassis, for example, being continuous from end to end and provided with a drop portion, or these side members may be built up, as desired.

Our invention, however, is especially adapted for use in connection with a standard motor-driven vehicle in which an explosive motor is employed, but it will be apparent that any other type of motor may be used to propel the vehicle.

When our invention is applied to a standard automobile chassis, definite sections of the side members of the chassis are cut away and a drop portion 10 provided for the frame, which is substituted for the cut-away portions. This drop portion may be formed in any approved manner, but we preferably employ rigid metallic plates 11 having portions thereof cut away, as at 12. These plates are riveted, welded, or otherwise suitably fastened to the severed ends of the standard chassis members, designated by the numeral 13, and are reinforced by vertical members 14; opposite plates 11 being connected together by a cross member 15 and two cross members 16. These cross members may have any cross sectional shape, but we preferably employ angle iron for the cross members 16. These angle iron members are in a plane a considerable distance below the side members 13 of the chassis, and on the horizontal webs thereof a platform 17 is arranged. This drop portion of the frame or chassis may be constructed in any approved manner so long as it serves to support said platform; and an auxiliary control mechanism to be hereinafter described.

18 designates the regular floor of the standard motor-driven vehicle, which floor is also cut out where the frame is provided with the drop portion 10. The front and rear of this drop portion are closed by means of walls 19, thus forming what may be termed a well, in which the driver or operator may stand.

In the type of motor-driven vehicles illustrated, the motor, designated by the numeral 20, is disposed at the front end of the vehicle in the usual manner, and it is covered by the usual hood 21. 22 designates the front traction wheels, and 23 the driving or rear traction wheels, the latter being mounted on the usual driving axle at the rear of the vehicle (not shown). The driving axle is driven from the motor 20 in the usual manner. Transmission or engine torque changing mechanism 24, forming part of the control mechanism of the vehicle, is provided in rear of the motor, and this transmission mechanism has the usual drive shaft 25 connected thereto by a universal joint 26, the rear end of said drive shaft being operperatively connected with the driving axle to which the driving or rear traction wheels 23 are attached.

The body or housing for the vehicle may be of any desired design or construction, except that it has door openings 27 leading thereinto from opposite sides, said openings extending from points near the upper end of the housing or body to a point in line with the platform 17, or depressed floor portion as it may be termed. These door openings may be closed with doors (not shown), arranged to slide thereover, or be otherwise applied to open and close the door openings. Doors are standard equipment on motor-driven trucks or delivery vehicles, but in this instance the doors differ from those of standard trucks or vehicles in that they extend downwardly a considerable distance below the true or regulation floor of the vehicle, which is at all times in the plane of the side members of the chassis, or above such plane.

By means of the construction thus far described, a depressed floor portion, transverse through-aisle, or platform is provided between the front and rear end portions of the vehicle. This depressed floor portion or platform is arranged to form a convenient and preferably short step from the road surface and when the vehicle is driven adjacent to a curb, this depressed floor portion or platform is on a level with the curb, or only a few inches above the curb; and in any event, a height much less than the average step. The driver of the vehicle is therefore enabled to enter or leave the vehicle while in upright position, and he can conveniently operate the vehicle while standing on the platform, as will presently appear.

Forming part of the transmission mechanism 24 is the usual shifting lever 28. The usual clutch foot pedal or actuator 29 is provided, which is operatively connected with the clutch of the vehicle in the usual manner, and 30 is what is termed the service brake foot pedal or actuator, also of standard construction. The emergency brake lever is designated by the numeral 31, and in the particular type of vehicle shown, both the service brake elements and the emergency brake elements are arranged on the rear driving wheels. In some types of automobiles, the emergency brake is otherwise arranged, but it will be apparent from the description to follow that our invention is adapted for use in connection with brakes of various kinds and having various locations on or applications to the vehicle.

The automobile or vehicle is also provided with steering mechanism, in which 32 designates the steering post, and 33 the steering wheel, all having the usual location. The parts operating to control the vehicle may be otherwise disposed, as our invention is adapted for use in connection with various forms of steering mechanisms applicable to vehicles.

In vehicles embodying our invention, we have provided various forms of movable seats adapted to be slid, swung, or otherwise moved from positions of use to positions of disuse. One form is illustrated in the drawings in which the seat, designated by the numeral 34, is mounted on a swinging stand 35 secured to the normal or standard floor 18 of the automobile in rear of the standing well. This seat is shown in full lines in its position of disuse, and in dotted lines in the position in which it is adapted for use.

When the driver is seated upon the seat, his feet rest upon the standard floor 18 forward of the standing well, or depressed floor portion 17, and he is then positioned exactly as he would be in a standard automobile. When seated, he is enabled to operate the vehicle in the usual manner, the traction wheels at the front of the vehicle being controlled by the steering wheel 33; the transmission gear being operated by the shifting lever 28; the emergency brakes by the emergency brake lever 31; the clutch by the clutch pedal 29, and the service brakes by the brake pedal 30, all while seated on the seat 34.

In rear of the transmission mechanism 24 and in a plane beneath that of the standard or true floor 18 of the vehicle, we have arranged auxiliary control mechanism; and in the form illustrated, which, however, may be varied under the principle involved, a rock shaft 36 is mounted in brackets 37 extending forwardly from the cross bar 15. These brackets are bolted or otherwise fastened to said cross bar or, if desired, may be cast in piece therewith.

Figure 4:
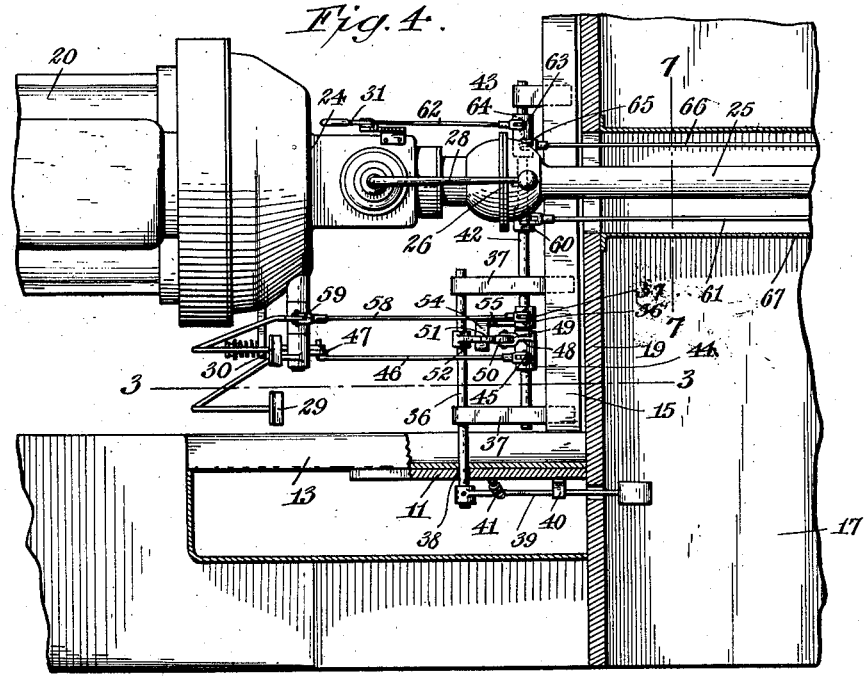
Fig. 4 is a horizontal section through a motor-driven vehicle, showing the control mechanism embodying our invention in plan view.

As clearly shown in Fig. 4, this rock shaft extends outwardly through the plate 11 at the left forming part of the drop portion of the frame, an opening 38 being provided in said plate for the purpose. Applied to the outer projecting end of this rock shaft is a multiple function vehicle controlling mechanism such as a foot pedal 39 which, in the illustrated embodiment, serves as a combined clutch and brake foot pedal. This pedal is normally held against a stop 40 extending outwardly from said plate, and for this purpose a retractile spring 41 is fastened at its upper end to said plate and at its lower end to said foot pedal.

Parallel with and in a plane in rear of the rock shaft 36, a second rock shaft 42 is arranged. This rock shaft is also journaled in the brackets 37 and extends a considerable distance toward the right hand side of the vehicle, the right hand end of said last-mentioned rock shaft being journaled in a bracket 43, also extending from the cross bar 15 of the drop portion of the frame or chassis. The rock shafts 36 and 42 may be otherwise journaled for rocking movement, but the arrangement shown and described serves the purpose admirably and provides the necessary spaced arrangement for the shafts and parts applied thereto, all to the end of providing a compact auxiliary control mechanism.

On the rock shaft 42 is loosely mounted a sleeve or elongated hub 44 having an arm or lever 45 extending upwardly therefrom, to which is connected the rear end of a clutch control rod 46, the front end of which has pivotal connection with a depending arm 47 extending from the hub of the clutch pedal 29. The sleeve or elongated hub 44 has a second arm or lever 48 extending upwardly therefrom, and at its upper end it is provided with a forwardly-directed forked portion 49 in which a roller 50 is rotatably arranged. This roller is arranged in contact with a cam 51 of suitable formation, disposed on the outer end of an upwardly and rearwardly extending arm 52 fastened to the rock shaft 36 having the foot pedal 39 secured thereto. The shape of this cam is such that when rocking the shaft 36 clockwise or against the action of the spring 41 secured to the foot pedal 39 extending from said shaft, the arm 48 is caused to swing rearwardly, with the result that the sleeve or elongated hub 44 on the rock shaft 42 is loosely rotated on said shaft and causes the arm or lever 45 to be swung rearwardly. This results in the clutch control rod 46 being drawn rearwardly and the clutch pedal 29 being forced forwardly and downwardly in the same manner as though operated from the seat 34. It will therefore be apparent that a certain movement of the foot pedal 39 will throw out the clutch of the vehicle, and this can be accomplished by the driver or operator while standing on the platform 17 and steering the vehicle by means of the steering wheel 33. If desired, the vehicle operator when seated, may operate pedal 39 with one foot, instead of using the separate pedals 29 and 30.

It is to be noted that the lower end of the cam 51 has a rearwardly extending toe 53, and that this toe is normally spaced a distance from a lateral extension 54 formed at the forward end of an arm or lever 55 extending forwardly from a hub 56 pinned or otherwise fastened to the rock shaft 42. This hub 56 also has an upstanding arm or lever 57, to the upper end of which is pivotally secured the rear end of a brake rod 58 which extends forwardly therefrom and has connection with the standard brake foot pedal 30 at a point above the axis of said pedal, as at 59. When, therefore, the toe 53 of the cam 51 comes in contact with the lateral extension 54 of the arm or lever 55, said arm or lever is depressed and causes the arm or lever 57 to be swung forwardly; thus moving the brake rod 58 in a forward direction and depressing the brake pedal 30. The clutch foot pedal 29 and the brake pedal 30 are standard equipment on automobiles and are maintained in normal position by the usual spring mechanisms provided in connection therewith; but this forms no part of our invention.

By reason of the fact that the arm or lever 55 is fastened to the rock shaft 42, said lever, upon being moved forwardly will cause said shaft to rock counterclockwise, and to this rock shaft between the inner bracket 37 and the bracket 43, a brake lever 60 is secured, to the outer end of which a brake rod 61 is pivotally connected, said rod being led rearwardly to the service brakes on the rear driving wheels, in a manner standard to motor-driven vehicles of this kind.

A brake rod 62 has its front end pivotally connected to the emergency brake lever and its rear end pivotally connected to the outer end of the arm or lever 63 extending upwardly from a sleeve or elongated hub 64 loosely mounted on the rock shaft 42. This sleeve or hub has a second armor lever 65 extending upwardly therefrom, to the upper end of which is pivotally connected the forward end of a brake rod 66 extending rearwardly for connection to the emergency brake at the rear or driving wheels of the vehicle, as is common in many types of motor-driven vehicles.

The service brake mechanism and the emergency brake mechanism therefore include brake rods, and each of these mechanisms has its rod portion in two offset sections, the rock shaft 42 and arms extending therefrom serving as intermediate means for connecting the brake rod sections of each brake mechanism.

The driving shaft 25 extends rearwardly over the depressed floor portion or platform 17 and the rear sections of the brake rods 61 and 66 are disposed at opposite sides of this driving shaft and in close proximity thereto, so that where these three parts extend over the depressed portion or platform 17 they are enclosed within a sheet metal or other suitable housing 67; this housing, as clearly shown in Fig. 7, being of inverted U-formation in cross section and suitably covering these parts so that it serves as a guard to prevent the driver or operator of the vehicle from coming in contact therewith.

In a standard automobile, the driving shaft and the rear sections of the brake rods, as used in the form illustrated, are only a few inches above the depressed floor portion or platform 17 so that it will not be inconvenient for the driver or operator to step over them in passing from one side of the vehicle to the other. The depressed floor portion or platform 17 extends the full width of the vehicle and the door openings formed in the sides of the body portion extend from this platform upwardly to within close proximity of the top of the body portion, thus making it unnecessary for the driver or operator to stoop in entering the vehicle.

In view of the fact that the drive shaft, where it extends rearwardly over the depressed floor portion or platform, is in close proximity to said platform and is caused to vibrate or oscillate due to deflection of the rear springs of the vehicle, such portion of the drive shaft would result in pinching or otherwise injuring the foot of a driver were he to accidentally or carelessly place his foot underneath the shaft, and the shield 67 therefore serves the purpose of a guard as well as an enclosure for the purpose of hiding the drive shaft and the brake rods adjacent thereto.

Figure 2:
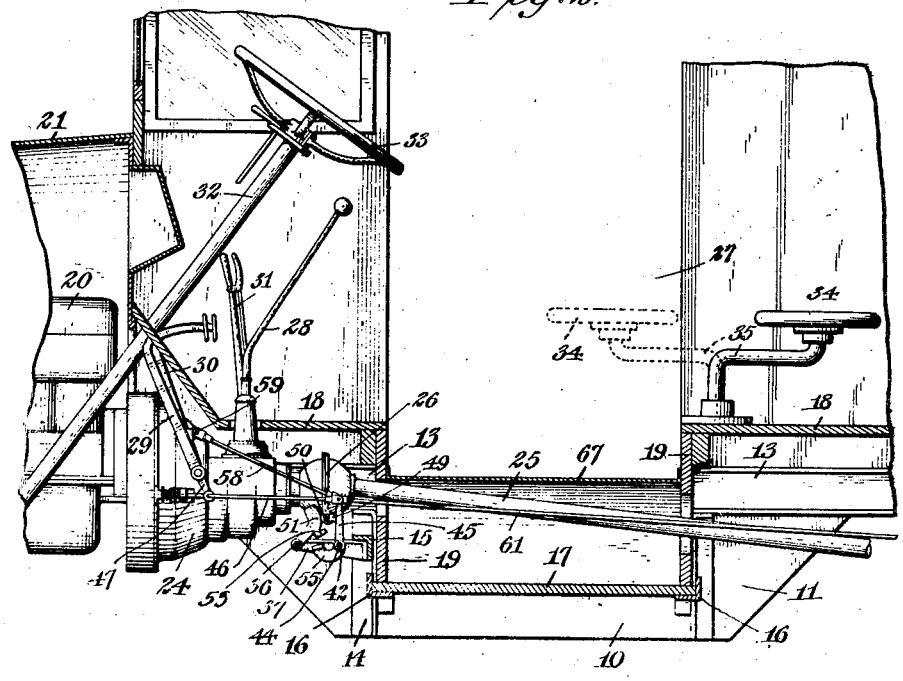
Fig. 2 is a longitudinal section through the intermediate portion of a motor-driven vehicle showing the drop in the frame or chassis of the vehicle and the standing platform.
Figure 3:
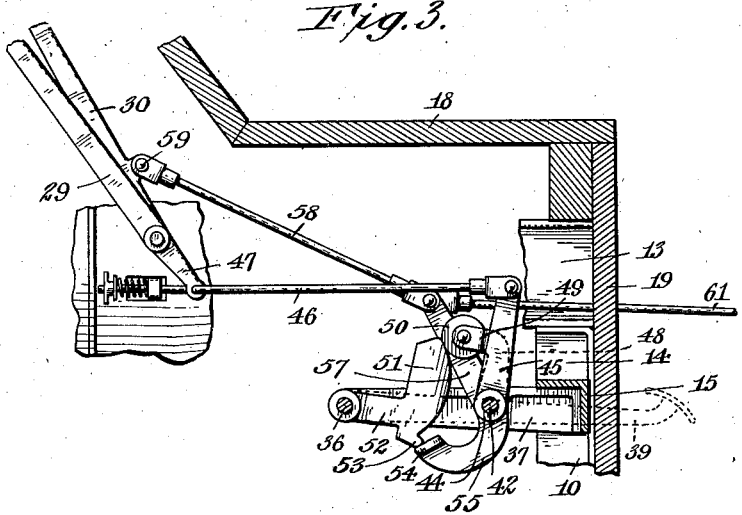
Fig. 3 is an enlarged longitudinal section, taken on line 3—3, Fig. 4.

Where, in motor-driven cars, both the motor and the driving wheels are in rear, or in front of the depressed floor portion or platform 17, the latter will be free of any projecting portions from side to side of the vehicle, and where a standard arrangement of motor and driving axle is provided and it is desired to eliminate all projecting parts on the depressed floor portion or platform 17, any one of various modified forms of driving mechanisms may be substituted for the standard driving mechanism illustrated for example in Figs. 2 and 4. We have shown one form of substitute mechanism or, as hereinbefore referred to, a modified form of our invention in Figs. 8 and 9, in which the motor shaft, designated by the numeral 68, is connected at its rear end with the front end of the driving shaft 25 by a suitable operating connection; that shown comprising a sprocket wheel 69 fastened to the rear end of the motor shaft 68, which projects outwardly from the transmission mechanism casing and extends into a housing 70 fastened to the transmission casing, or otherwise, and serving also as a support, if desired, for the front end of the driving shaft 25. In this housing is journaled a short shaft 71 which has connection with the driving shaft 25 by a universal joint 72, similar to the connection of the standard driving shaft with the engine shaft, as shown for example in Figs. 2 and 4.

The short shaft 71 is disposed parallel with the motor shaft 68 and beneath the same, and it has a sprocket wheel 73 secured thereto, around which and the sprocket wheel 69 on the motor shaft, a sprocket chain 74 is passed; thus the rotatable movement of the motor shaft 68 is imparted to the short shaft 71, which may be considered a short section of the driving shaft and which has universal connection with the major or rear portion of said driving shaft. In this instance, the driving shaft 25 is disposed beneath and in close proximity to the depressed floor portion or platform 17; thus eliminating all projecting portions on the upper side of this platform. For reasons quite apparent, the inclination of the driving shaft may vary under driving conditions in the same manner as that in the standard automobile driving mechanism, illustrated for example in Figs. 2 and 4.

While, in the drawings, we have illustrated an auxiliary control mechanism in connection with the standard control mechanism of a motor-driven vehicle, so that the vehicle may be operated by a driver or operator while standing within the vehicle, it will, of course, be understood that our invention may be embodied within a specially constructed vehicle in which the control mechanism may vary from that shown, and that control mechanism may be employed wherein the same elements are initially placed into action by the driver or operator when seated as when standing.

It will also be apparent that the driving mechanism extending from the motor, when situated forward of the standing place, may be connected with any form of driving mechanism extending rearwardly to the rear or driving axle.

It will further be apparent that since it is found necessary, in large cities, for the driver or operator of a motor-driven vehicle to travel many miles after leaving the employer's place of business, before reaching his first delivery point, it will be quite convenient for him to operate the vehicle, due to the fact that a convenient seat is provided for him to enable him to operate the vehicle in the same manner as a standard automobile, and while making his deliveries it will be found more convenient, more economical and less tiresome to operate the vehicle while standing upon the depressed floor portion or platform 17. The time required in delivering the packages or parcels within the vehicle will be shortened considerably and he will again be able to return to his employer's place of business with the same comforts provided for a driver sitting within a standard automobile.

We desire also to stress the fact, that the vehicle is steered in its course of travel by a single steering wheel or element regardless of whether the driver or operator is in a standing or sitting position, and that in either case he is directly in rear of said steering wheel or element; also that all parts of the control mechanism required to be operated in order to properly control the vehicle, are conveniently accessible to the driver or operator without changing his position, whether standing or seated.

The depressed floor portion 17 and the seat 34 when in its position of use are relatively disposed so that the driver's or operator's eyes are at approximately the same elevation above the depressed floor portion or platform, whether standing on said depressed floor portion and operating the vehicle, or seated on said seat. This gives the driver or operator the same vision or view ahead and sidewise in either case.

We wish further to stress the fact that when stalled in snow or in a rut or soft soil, it is possible for the driver or operator, owing to the slight elevation of the depressed floor portion or platform above the road surface, to shift the transmission mechanism of the vehicle into low gear, then step out of the vehicle and push the same to aid the motive power in overcoming the resistance encountered, and if successful, step into the vehicle without effort, while in motion.

Automobiles as now used have controlling mechanism which includes means for steering the vehicle; means for changing the speed of the vehicle; means for releasing the vehicle clutch, and means for applying brakes to some or all of the wheels of a vehicle, and where in the specification and claims the words "standard control mechanism" is employed, we have reference to at least part of these, and unless otherwise particularly specified, we have reference by this term to the clutch and brake pedals with which vehicles are now equipped, and the parts directly associated therewith for functioning under action of such pedals.

Our invention may be modified in various ways and adapted to any type of motor-driven vehicle, but it is particularly designed to be embodied within a standard type of motor-driven vehicle, preferably to a light truck chassis of standard make; the chassis being modified to form a drop portion therein for the purpose of providing a depressed floor portion or platform, and on which may be mounted, or around which may be built, a body of any desired construction or design.

Having thus described our invention, what we claim is:—

1. A motor-driven vehicle having a standard chassis, the side members of which are provided with depressed portions between their ends, a platform extending from the depressed portion of one side member to the other and on which a driver or operator may stand, connecting members connecting the depressed portions of said side members, supports on one of said connecting members, a rock shaft journaled in said supports, a cam on said rock shaft, a foot pedal secured to said rock shaft and spring-retained in normal position, a second rock shaft having a lever secured thereto, a brake pedal for said vehicle, a connecting rod connecting said brake pedal with said lever, a second lever loosely mounted on said second rock shaft, a clutch pedal for said vehicle, a rod connecting said clutch pedal with said second lever, a third lever mounted on said second rock shaft movable with said second lever and adapted to be actuated by said cam, an arm on said second rock shaft movable with said first lever and adapted to be actuated by said cam, brakes applied to the rear wheels of the vehicle, a lever connected to said second rock shaft, and connection between said last-mentioned lever and said brakes to cause the brakes to be applied to said wheels upon actuation of said brake pedal and upon actuation of said foot pedal.

2. A motor-driven vehicle having standard control-mechanism including a pair of actuators, a floor for the vehicle having a depressed portion between its front and rear ends on which a driver or operator may stand, a short elevated front floor portion from which said pair of actuators extend upwardly and an elevated rear load-carrying floor portion, and auxiliary control-mechanism including a single actuator arranged adjacent said depressed floor portion, said auxiliary control-mechanism being connected with said pair of actuators in a manner to permit direct individual actuation of either of said pair of actuators without actuating said auxiliary control-mechanism and being operable under foot actuation of the driver or operator when standing on said depressed floor portion.

3. A motor-driven vehicle having standard control-mechanism including clutch and brake pedals, a floor having a depressed floor portion between its ends on which a driver or operator may stand, an elevated front floor portion and an elevated rear load-carrying floor portion, the several parts of said control-mechanism including said clutch and brake pedals being selectively operable in the usual manner, and a combined clutch and brake pedal adjacent said depressed floor portion connected to said clutch and brake pedals to actuate said clutch pedal alone, or both said clutch and brake pedals, said combined clutch and brake pedal being operable by the driver or operator when standing on said depressed floor portion.

4. A motor-driven vehicle having standard control-mechanism including clutch and brake pedals, a floor for said vehicle having a depressed floor portion on which a driver or operator may stand, an elevated front floor portion and an elevated rear load-carrying floor portion, a seat on which the driver or operator may be seated, said control-mechanism extending upwardly from said elevated front floor portion and said front floor portion serving as a foot-rest for the driver or operator when seated on said seat, an auxiliary pedal adjacent the depressed floor portion operable by the driver or operator when standing on said depressed floor portion, and mechanism intermediate said auxiliary pedal and said clutch and brake pedals whereby, upon movement of said auxiliary pedal through a predetermined range, said clutch pedal will be actuated and upon further movement of said auxiliary pedal said brake pedal will be actuated.

5. A motor-driven vehicle having a body portion provided between its ends with a depressed floor portion on which a driver or operator may stand, and floor portions in front and rear of said depressed floor portion elevated with respect to the latter, the elevated front floor portion having brake and clutch pedals readily accessible to the feet of a driver or operator when seated, a rock shaft mounted forward of said depressed floor portion, a foot pedal adjacent said depressed floor portion and operable by the driver or operator when standing on said depressed floor portion and adapted to rock said shaft, means interposed between said rock shaft and said clutch and brake pedals actuated by said rock shaft and operatively connected to said clutch and brake pedals to actuate said clutch pedal or successively actuate said clutch and brake pedals.

6. A motor-driven vehicle having a floor provided with a depressed floor portion on which a driver or operator may stand, an elevated front floor portion and a comparatively long elevated rear load-carrying floor portion, standard control-mechanism for operating the vehicle comprising a plurality of elements rising above the elevated front floor portion, said control-mechanism including a steering element, a seat movable into a position of use or disuse and when in its position of use being arranged directly in rear of said steering element and having the remaining elements of said control-mechanism accessible to the driver or operator when seated on said seat, said elevated front floor portion serving as a foot-rest for the driver when seated on said seat, and auxiliary mechanism connected with certain parts of said standard control-mechanism and having a single foot pedal arranged adjacent to and directly above said depressed floor portion to enable the driver or operator to actuate the same when standing on said depressed floor portion, other parts of said standard control-mechanism being accessible to be operated by the hand of the driver or operator standing on said depressed floor portion.

7. A motor-driven vehicle having a body provided with a depressed floor portion on which a driver or operator may stand, an elevated front floor portion and an elevated rear floor portion, brakes applied to the rear wheels of the vehicle, a clutch pedal for the clutch of said vehicle extending upwardly from said elevated front floor portion, a brake pedal also extending upwardly from said elevated front floor portion and adapted for co-action with said brakes, and mechanism including a single foot pedal arranged directly above said depressed floor portion and operable by the driver or operator when standing on said depressed floor portion, said mechanism being connected to said clutch pedal and said brake pedal and to said brakes, said single pedal having a definite range of movement and said mechanism including means for causing actuation of said clutch pedal to throw out the clutch of the vehicle during the initial portion of the movement of said single foot pedal and for causing actuation of said brakes during the remainder of the movement of said single foot pedal, said single foot pedal being movable to any extent desired.

8. A delivery vehicle comprising a chassis having a plurality of longitudinal frame members, front and rear wheels supporting said frame members, said members having portions intermediate said front and rear wheels depressed to a low level, a platform supported by and connecting said depressed frame portions forming a transverse through aisle said platform projecting outwardly beyond said frame members, a substantially vertical wall extending upwardly from said platform forwardly of said transverse aisle, an elevated load floor forwardly of said wall, an internal combustion engine on said chassis, forward of said aisle for driving the vehicle, a selective gear transmission, a shift lever extending upwardly from said floor and operable by the vehicle operator from a standing or seating position in said aisle, a clutch, brakes for said vehicle, and a foot pedal in said aisle extending through said wall adapted to operate both said clutch and said brakes, said shift lever being positioned for convenient manipulation when the vehicle operator is standing in said aisle in position to operate said foot pedal.

EDWARD C. OBERKIRCHER.
CHARLES G. KAELIN.